United States Patent [19]

Bailly

[11] Patent Number: 5,208,303
[45] Date of Patent: May 4, 1993

[54] PROCESS FOR PREPARING A VANADIUM-BASED CATALYST SUITABLE FOR OLEFIN POLYMERIZATION

[75] Inventor: Jean-Claude A. Bailly, Martigues, France

[73] Assignee: BP Chemicals Limited, London, England

[21] Appl. No.: 736,791

[22] Filed: Jul. 29, 1991

Related U.S. Application Data

[62] Division of Ser. No. 561,786, Aug. 2, 1990, Pat. No. 5,070,054.

[30] Foreign Application Priority Data

Aug. 8, 1989 [FR] France .................. 89 10856

[51] Int. Cl.$^5$ .......................... C08F 4/68; C08F 210/06
[52] U.S. Cl. ........................... 526/125; 526/119; 526/348.6; 526/352; 526/348; 526/901; 526/904
[58] Field of Search ............................................. 526/125

[56] References Cited

U.S. PATENT DOCUMENTS

| | | | |
|---|---|---|---|
| 3,457,244 | 7/1969 | Fukuda et al. | 526/283 |
| 4,471,066 | 9/1984 | Sakurai et al. | 526/116 |
| 4,487,846 | 12/1984 | Bailly et al. | 502/104 X |
| 4,490,475 | 12/1984 | Bailly et al. | 526/125 |
| 4,497,904 | 2/1985 | Blaya et al. | 502/104 |
| 4,511,703 | 4/1985 | Bailly et al. | 502/126 X |
| 4,579,833 | 4/1986 | Collomb et al. | 502/104 |
| 5,077,358 | 12/1991 | Durand et al. | 526/125 |

FOREIGN PATENT DOCUMENTS

| | | |
|---|---|---|
| 099772 | 2/1984 | European Pat. Off. . |
| 155770 | 9/1985 | European Pat. Off. . |

*Primary Examiner*—Edward J. Smith
*Attorney, Agent, or Firm*—Brooks Haidt Haffner & Delahunty

[57] ABSTRACT

The present invention relates to a process for preparing a Ziegler-Natta type catalyst based on a vanadium compound precipitated on a $MgCl_2$ spherical support. The catalyst preparation consists of contacting within a liquid hydrocarbon a vanadium-reducing agent chosen from organometallic compound with a vanadium compound soluble in the liquid hydrocarbon at least one halogen and one alkoxy group, and with a support containing (i) $MgCl_2$ free from Mg—C bond and (ii) an organic electron donor compound free from labile hydrogen. The support consists of spherical particles having a well-defined diameter and a narrow particle size distribution. The catalyst is particularly suitable for manufacturing in a gas process elastomeric copolymers of propylene.

21 Claims, No Drawings

PROCESS FOR PREPARING A VANADIUM-BASED CATALYST SUITABLE FOR OLEFIN POLYMERIZATION

This application is a division of application Ser. No. 07/561,786 filed Aug. 2, 1990, now U.S. Pat. No. 5,070,054.

The present invention relates to a process for the preparation of a vanadium-based catalyst of the Ziegler Natta type, supported on spherical particles of magnesium chloride. This catalyst is suitable for the polymerization of olefins and is particularly adapted to the manufacture of elastomeric propylene copolymers, especially according to a gas phase copolymerization process.

It is known that catalyst systems of the Ziegler Natta type consist of a catalyst comprising at least one compound of a transition metal, such as titanium, and of cocatalyst comprising at least one organometallic compound of a metal such as aluminum. It is known, furthermore, that the properties of these catalysts can be greatly affected when the transition metal compound is employed with a support consisting of a solid inorganic compound, such as magnesium chloride. In the technique of preparation of a supported catalyst the properties of the support and the process for preparing the catalyst, which generally consists in fixing the transition metal compound on said support, are of very great importance for the catalyst's characteristics and behaviour in a reaction of polymerization or copolymerization of olefins.

According to European Patent Application EP-A-0,099,772 it is known to prepare a catalyst by precipitation of a transition metal compound on a spheroidal support of magnesium chloride which includes products containing a Mg—C bond and a low proportion of an electron-donor compound. The transition metal compound is a halogenated titanium compound ad the precipitation of the latter on the support is performed by a reaction of reduction of the titanium compound with a reducing agent, such as an organometallic compound. The catalyst is employed for the manufacture of ethylene polymers. It has been observed, however, that is does not allow elastomeric propylene copolymers to be manufactured in satisfactory conditions.

According to European Patent Application EP-A-0,155,770 it is known to prepare a catalyst by precipitation of a vanadium compound on a spheroidal support of magnesium chloride which includes products containing an Mg—C bond and a small quantity of an electron-donor compound. The precipitation is performed by a reaction of reduction of the vanadium compound in the presence of this support, without addition of a reducing agent. The reduction reaction is in all probability initiated spontaneously by the products containing an M—C bond which are present in the support. The catalyst is employed for manufacturing ethylene polymers having a broad molecular weight distribution. It has been observed, however, that this process requires the use of a large quantity of the vanadium compound, only a small portion of which is fixed on the support. Catalyst washing operations are generally necessary to remove the excess of the vanadium compound which is not fixed on the support, operations which are costly and difficult because of the toxic and corrosive nature of vanadium compounds.

A process for the manufacture of a vanadium-based spherical catalyst supported on magnesium chloride has now been found, a process which enables the disadvantages mentioned above to be avoided. In particular, this process makes it possible to prepare a spherical vanadium catalyst which exhibits a high activity in the polymerization of olefins. This catalyst is particularly adapted to the manufacture of elastomeric propylene copolymers, especially using a gas phase copolymerization process. In this case, the catalyst enables an elastomeric propylene copolymer powder to be manufactured directly in the form of spherical and nonadhesive particles, this powder having good flow properties and being easy to handle.

The subject matter of the present invention is a process for the preparation of a catalyst based on a vanadium compound precipitated within a liquid hydrocarbon by a reduction reaction of vanadium on a spherical support of magnesium chloride, a process characterized in that the precipitation is carried out by bringing into contact within the liquid hydrocarbon:

a. a vanadium-reducing agent chosen from organometallic compounds, with b. vanadium compound soluble in the liquid hydrocarbon, containing at least one halogen and one alkoxy group, and c. a solid support containing (i) form 80 to 99.5 mol % of magnesium dichloride which is substantially free from any product containing an Mg—C bond, and (ii) from 0.5 to 20 mol % of at least one organic electron-donor compound, D, free form labile hydrogen, the said solid support consisting of spherical particles which have a mass-average diameter, Dm, of 10 to 100 microns and a narrow particle size distribution such that the ratio of Dm to the number-average diameter, Dm of the particles is less than 2.

According to the present invention, the preparation of the catalyst employs a particular magnesium chloride support. The support is substantially free from products containing an Mg—C bond, which is equivalent to saying that the ratio of the number of Mg—C bonds to the number of magnesium atoms in the support is less than 0.001. The precipitation of the vanadium compound on the support is not therefore initiated spontaneously by a reaction of reduction of the vanadium by a reducing agent present in the support. The reduction of the vanadium is performed by means of a reducing agent chosen from organometallic compounds, which is brought into contact with the particular magnesium chloride support and the vanadium compound. The surprising aspect of this preparation is linked with the fact that the vanadium compound is fixed on the solid support without being substantially precipitated beside the particles of the support.

The particular magnesium chloride support includes a relatively large quantity of an organic electron-donor compound D. This characteristic contributes astonishingly to fixing a large quantity of the vanadium compound in the support and to endowing the catalyst with a remarkable activity in the polymerization or copolymerization of olefins. The support contains from 80 to 99.5 mol % of magnesium dichloride and from 0.5 to 20 mol % of compound D. It preferably contains from 80 to 95 mol % of magnesium dichloride and from 5 to 20 mol % of compound D and yields excellent vanadium-based catalysts for the polymerization of olefins. Remarkable results are obtained in the manufacture of elastomeric propylene compolymers when the support employed contains from 80 to 90 mol % of magnesium dichloride and from 10 to 20 mol % of compound D.

The organic electron-donor compound, D, is known as such, or as a Lewis base. It is free from labile hydrogen and, consequently, cannot be chosen from water, alcohols or phenols, for example. It may have a relatively low complexing power in relation to magnesium dichloride. It is advantageously chosen from ethers, thioethers, sulphones, sulphoxides, phosphines, amines and amides. Ethers are preferably employed.

It has been found that the results are obtained when the support is in the form of a homogeneous composition, that is to say a composition where the compound D is distributed homogeneously throughout the magnesium chloride particle, from the core to the periphery of the latter, and not only at its periphery. As a result, in order to obtain a support of this kind, it is recommended to prepare it by a method using a precipitation. In this case, the compound D is chosen from products likely not to react with the reactants employed for the precipitation. For instance, the compound D cannot be chosen from carboxylic acid esters which react with Grignard or organomagnesium compounds.

It has been found, furthermore, that the support yields high-performance catalysts capable of withstanding the enormous growth stresses during the polymerization when it has an essentially amorphous structure, that is to say a structure where the forms of crystallinity have to a large extent or even completely disappeared. This particular form of the support can consequently be obtained only be a precipitation carried out in relatively precise conditions.

The support is additionally characterized by the fact that it consists of spherical particles which have a mass-average diameter of 10 to 100 microns, preferably of 20 to 50 microns. The particles of the support have a very narrow particle size distribution such that the ratio Dm/Dn of the mass-average diameter Dm to the number-average diameter Dn is less than 2. More particularly, the particle size distribution of these particles may be extremely narrow, such that the ratio Dm/Dn is from 1.1 to 1.5; a virtually complete absence of particles of a diameter greater than 1.5×Dm or smaller than 0.6×Dm may be noted; the particle size distribution can also be assessed by the fact that more than 90% by weight of the particles of the same single batch lie within the range Dm±10%.

Spherical particles are intended to mean particles which are substantially spherical, that is to say whose ratio of the long axis to the short axis is equal to or less than approximately 1.5, preferably less than 1.3.

The specific surface of the support particles may be from 20 to 100 m²/g (BET), preferably from 30 to 60 m²/g (BET) and the relative density of these particles may be approximately 1.2 to 2.1.

The support may especially be prepared by reacting a dialkylmagnesium compound with an organic chlorine compound in the presence of the electron-donor compound D. The dialkylmagnesium compound chosen may be a product of formula $R_1MgR_2$, in which $R_1$ and $R_2$ are identical or different alkyl radicals containing from 2 to 12 carbon atoms. One of the important properties of this dialkylmagnesium compound is being directly soluble in the hydrocarbon medium where the preparation of the support will be carried out. The organic chlorine compound chosen is an alkyl chloride of formula $R_3Cl$ in which $R_3$ is a secondary or, preferably, tertiary alkyl radical containing from 3 to 12 carbon atoms. The electron-donor compound D employed is preferably an ether of formula $R_4OR_5$ in which $R_4$ and $R_5$ are identical or different alkyl radical from 1 to 12 atoms.

In addition, the various reactants used for the preparation of the support may be employed in the following conditions:

the molar ratio $R_3Cl/R_1MgR_2$ is from 1.9 to 2.5, preferably form 2 to 2.3, the molar ratio $D/R_1MgR_2$ is from 0.1 to 1.2, preferably from 0.3 to 0.8.

The reaction between $R_1MgR_2$ and $R_3Cl$ in the presence of the electron-donor compound D is a precipitation which takes place with stirring within a liquid hydrocarbon. A person skilled in the art knows that, in this case, physical factors such as the viscosity of the medium, the method and rate of stirring and the conditions of use of the reactants can play a major part in the form, the structure, the size and the particle size distribution of the precipitated particles, everything else being equal. However, to obtain an excellent characterized especially by the presence of a large quantity of the electron-donor compound D, it is recommended to perform the precipitation reaction at a relatively low temperature, ranging form 10° to 50° C., preferably from 15° to 35° C. It is recommended, furthermore, that the precipitation reaction should take place extremely slowly, over a period of at least 10 hours, preferably a period ranging from 10 to 24 hours, so as to permit an appropriate organization of the solid product formed, in particular the insertion of a large quantity of the compound D and its uniform dispersion in the support thus formed.

The catalyst preparation process consists in precipitating a vanadium compound on the magnesium chloride support within a liquid hydrocarbon. The liquid hydrocarbon may be one or more alkanes, such as n-heptane. The vanadium compound is a product which is soluble in the liquid hydrocarbon. It is known that, in general, vanadium compounds which are soluble in hydrocarbons are those in which the vanadium has its maximum valency, that is to say valency 4, or else those in which the vanadyl group has its maximum valency, that is to say valency 3.

The vanadium compound contains at least one halogen, X, and at least one alkoxy group of formula OR. It has been noted that the catalysts most likely to manufacture elastomeric propylene copolymers in a gaseous phase are those prepared with a vanadium compound in which the molar ration X/OR is from 0.05 to 20, preferably from 1 to 10. With such catalysts, it has surprisingly been observed that it is possible to directly manufacture in a gaseous phase a nonadhesive elastomeric copolymer powder which has good flow properties. It has also been noted that an elastomeric propylene copolymer prepared in this way has a relatively narrow molecular weight distribution.

More particularly, the vanadium compound may correspond to either of the two general formulae

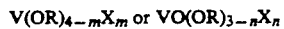

in which formulae R denotes an alkyl radical containing from 1 to 12 carbon atoms, X a halogen atom, such as bromine or chlorine, m an integral or fractional number which range from 0.2 to 3.8, preferably from 2 to 3.6, and n an integral or fractional number which may range from 0.14 to 2.85, preferably from 1.5 to 2.7. The vanadium compound may be prepared by making a suitable mixture of a vanadium halide of formula $VOX_3$ or $VX_4$ with a vanadium alkoxide of formula $VO(OR)_3$ or $V(OR)_4$, or else a mixture of a vanadium halide of formula $VOX_3$ or $VX_4$ with an alcohol of formula ROH, the groups X and R of the formulae having the same definitions as those mentioned above. Among the vanadium halides, vanadium tetrachloride or vanadyl trichloride are advantageously employed and, among the vanadium alkoxides it is preferred to employ vanadyl tri-n-propoxide, vanadyl triisopropoxide or vanadium tetra-n-propoxide. The vanadium compound may be prepared either before its use for the preparation of the catalyst or directly within the liquid hydrocarbon where the precipitation of the catalyst will take place, optionally in the presence of the support.

The quantity of vanadium compound which is employed to prepare the catalyst depends on the desired quantity of vanadium to be fixed in the support and on the quantity of organic electron-donor compound D present in the support. The quantity of vanadium compound to be employed during the catalyst preparation is generally from 0.05 to 2, preferably from 0.1 to 1 mole per mole of magnesium dichloride of the support.

The catalyst preparation process consists in precipitating the vanadium compound on the support by a reaction of reduction of the vanadium with a reducing agent chosen from organometallic compounds, in particular from organometallic compounds of metals belonging to groups II or III of the Periodic Classification of the elements. Organoaluminium, organomagnesium or organozinc compounds are preferably employed. It is possible, in particular, to employ a trialkylaluminium, such as triethylaluminium or triisobutylaluminium, or preferably an alkylaluminium halide, such as diethylaluminium chloride. The reducing agent may be employed in a relatively small quantity if bursting of the catalyst into fine particles during the polymerization is to be avoided. The quantity of the reducing agent employed during the catalyst precipitation is generally from 0.05 to 1.5, preferably from 0.1 to 1 mole per mole of magnesium dichloride of the support. Furthermore, the catalyst may be prepared in the presence of an additional quantity of an electron-donor compound, identical with or different from that present in the support.

The vanadium fixed in the support is essentially in the reduced state. The precipitation of the catalyst within the liquid state. The precipitation of the catalyst within the liquid hydrocarbon is performed by bringing the support into contact with the vanadium compound and the reducing agent at a temperature which may be from 0° to 120° C., preferably from 50° to 90° C. The period of contact may be approximately from 0.5 to 15 hours.

In practice, the precipitation of the catalyst may be performed in various ways. For example, the reducing agent and the vanadium compound may be added simultaneously to a suspension of the magnesium chloride support in the liquid hydrocarbon. The mixture thus prepared may be kept stirred for a period of 0.5 to 15 hours. Another method may consist in adding the reducing agent and the vanadium compound successively in either order to the suspension of the magnesium chloride support. In particular, in order to increase the quantity of vanadium fixed in the support, it may be preferable first to place the reducing agent in contact with the suspension of magnesium chloride support and then to add the vanadium compound to this suspension. Although the major part of the quantity of the vanadium compound employed is fixed in the support, the catalyst may be washed one or more times with a liquid hydrocarbon.

It is found, surprisingly, that the essentially amorphous structure and the morphology of the support do not change during the preparation of the catalyst. Thus, the catalyst obtained consists of particles whose physical properties are practically identical with those of the particles of the initial support. In particular, the catalyst consists of spherical particles which have a mass-average diameter of 10 to 100 microns, preferably of 20 to 50 microns, and a particle size distribution of less than 2, as measured by the ratio of the mass-average diameter to the number-average diameter.

The advantage of this process of preparation is linked with the fact that most of the vanadium compound employed is fixed in the support. It is generally found that more than 80%, and even more than 90% of the vanadium compound employed during the preparation is fixed in the support. Another characteristic of this process is that the vanadium compound is fixed homogeneously throughout the support, rendering the catalyst more robust during the polymerization. In fact, the vanadium compound is distributed homogeneously in each particle of support, from the core to the periphery of the latter. It is observed that the organic electron-donor compound D, initially present in the support, diminishes appreciably in the catalyst. From this it may be concluded that the vanadium compound can be fixed in the support wherever the compound D leaves a vacancy. It is observed, furthermore, that the catalyst includes a part of the reducing agent employed during the precipitation, but in a form converted by the reduction reaction. The catalyst thus obtained may contain, per mole of magnesium dichloride, from 0.05 to 2 moles of vanadium, from 0.01 to 0.1 mole of electron-donor compound and from 0.05 to 1 mole of reducing agent in a form converted by the reduction reaction. The catalyst prepared according to the present invention can be employed for polymerizing or copolymerizing under industrial conditions olefins containing from 2 to 12 carbons atoms, such as ethylene, propylene, 1-butene, 1-hexene, 4-methyl-1-pentene or 1-octene. It is particularly suitable for the manufacture of elastomeric propylene copolymers, especially those containing from 30% to 70% by weight of propylene and from 70% to 30% by weight of ethylene and/or of 1-butene and optionally an unconjugated diene, such as ethylidenenorbornene, 4-methyl-1-1,4-hexadiene and 2-methyl-1,5-hexadiene or 1,4-hexadiene. The elastomeric copolymers may be advantageously manufactured in a gaseous phase in a fluidized and/or methanically stirred bed reactor. The propylene copolymerization reaction is performed by employing the catalyst together with a cocatalyst chosen from the organometallic compounds of a metal belonging to groups I to III of the Periodic Classification of the elements, and advantageously with an activator chosen from halogenated hydrocarbons. The catalyst and the cocatalyst are generally employed in proportions such that the molar ratio of the quantity of vanadium of the catalyst is between 0.5 and 50. The copolymerization reaction may be performed at a temperature of approximately between 0° C. and 60° C., at a total pressure ranging from 0.1 to 5 MPa. The catalysts prepared according to the invention can be used directly or after having been subjected to an olefin prepolymerization operation carried out in one or more stages in a gaseous phase and/or in suspension in a liquid hydrocarbon medium. The prepolymerization operation results in an increase in the size of the catalyst particles while preserving the morphology of the latter. It consists in bringing the catalyst and the cocatalyst into contact with one or more olefins. The prepolymerization reaction may be conducted while maintaining a suitable activity of the catalyst until 10 to 500 g and preferably 30 to 250 g of polyolefin is obtained per millimole of vanadium. During the propylene copolymerization reaction a uniform development of each copolymer particle is observed and an elastomeric propylene copolymer is obtained, consisting of a nonadhesive powder which has good flow properties and a high bulk density, generally of between 0.3 and 0.5 g/cm$^3$. The copolymer has a relatively narrow molecular weight distribution, characterised by a ratio of the weight-average molecular weight Mw to the number-average molecular weight Mn of between 6 and 11. Furthermore, it may contain a very low proportion of vanadium, generally less than 15 parts per million by weight.

Method of Determining the Mass-Average (Dm) and Number-Average (Dn) Diameters of Particles According to the invention, the mass-average (Dm) and number-average (Dn) diameters of the support or catalyst particles are measured on the basis of microscopic observations using the Optomax image analyser (Micro-Measurements Ltd., Great Britain). The principle of the measurement consists in obtaining, from the experimental study of a population of particles using optical microscopy, a frequency table which gives the number ($n_i$) of particles belonging to each class (i) of diameters, each class (i) being characterized by an intermediate diameter ($d_i$) included within the limits of the said class. According to approved French Standard NF X 11-630 of June 1981, Dm and Dn are given by the following formulae:

$$\text{mass-average diameter: } Dm = \frac{\Sigma n_i(d_i)^3 d_i}{\Sigma n_i(d_i)^3}$$

$$\text{number-average diameter: } Dn = \frac{\Sigma n_i \cdot d_i}{\Sigma n_i}$$

The ratio Dm/Dn characterizes the particle size distribution; it is sometimes called "width of the particle size distribution". The measurement using the Optomax image analyzer is carried out by means of an inverted microscope which permits the examination of the suspensions of support or catalyst particles with a magnification of between 16 and 200 times. A television camera picks up the images given by the inverted microscope and transmits them to a computer which analyses the images received line by line and point by point on each line, in order to determine the particle dimensions or diameters and then to classify them.

The following nonlimiting examples illustrate the invention.

EXAMPLE 1

Preparation of a Support 10.2 liters of a mixture containing 10 moles of dibutylmagnesium in n-hexane, 6.45 liters of n-hexane and, lastly, 1 liter of diisoamyl ether are introduced in succession during a first stage under nitrogen, at ambient temperature, into a 30-liter stainless steel reactor equipped with a stirring system rotating at a speed of 600 revolutions per minute and with a jacket. In a second stage, where the speed of the stirring system is maintained at 600 revolutions per minute and the temperature of the reactor at 25° C., 2.4 l of tert-butyl chloride are added at a constant rate over 12 hours to the mixture thus obtained. At the end of this time the reaction mixture is kept at 25° C. for 3 hours. The precipitate obtained is washed with 15 liters of n-hexane. Washing of the precipitate is repeated 6 times. The solid product obtained forms the support (A) based on magnesium dichloride, containing 0.12 moles of diisoamyl ether per mole of magnesium dichloride and less than 0.001 mole of Mg-C bond. Under microscopic examination the support (A) has the form of spherical particles with a mass-average diameter of 21 microns and an extremely narrow particle size distribution, such that the ratio Dm/Dn of the particles is equal to 1.4.

The specific surface of the support (A) is approximately 45 m$^2$/g (BET). The structure of the magnesium chloride in the support is essentially amorphous.

EXAMPLE 2

Preparation of a Catalyst

A suspension of the support (A) prepared in Example 1, containing 0.1 mole of magnesium dichloride in 150 ml of n-hexane is introduced at ambient temperature and under a nitrogen atmosphere into a one-liter glass reactor equipped with a stirring system rotating at a speed of 250 revolutions per minute. 100 ml of a solution containing 0.2 mole/liter of diethylaluminium chloride in n-hexane are added over one hour to this suspension, which is kept stirred and at ambient temperature (25° C.). The mixture is kept stirred for 1 hour at 35° C. At the end of this time the suspension, kept stirred, is heated to a temperature of 50° C. and 100 ml of a solution containing 0.16 mole/l of vanadyl trichloride and 0.04 mole/l of vanadyl tri-n-propoxide in n-hexane are added to it over 4 hours. A new suspension is thus obtained, which is kept stirred for a period of 2 hours at a temperature of 80° C. The stirring is then stopped and the catalyst allowed to settle. After removal of the supernatant liquid phase, the catalyst is subjected to 2 successive washings, 200 ml of n-hexane at 50° C. being used each time, and then to 3 successive washings, 200 ml of n-hexane at 25° C. being used each time.

The catalyst (B) is isolated and stored under a nitrogen atmosphere. It contains, per mole of magnesium:

0.18 moles of total vanadium (Vt)
0.09 moles of trivalent vanadium (V$^{3+}$)
2.56 moles of chlorine (Cl)
0.04 moles of diisoamyl ether (DIAE)
0.1 mole of n-propoxy group (OR)
0.1 mole of aluminium (Al)

The elements of the catalyst correspond, as shown in Table 1, to molar ratios V$^{3+}$/Vt=0.5, Vt/Mg=0.18, Cl/Mg=2.56, Al/Mg=0.1, DIAE/Mg=0.04, OR/Mg=0.1 and to 6.6 weight % of vanadium in the catalyst.

The catalyst (B) is in the form of particles which are substantially identical with those of support A in shape and in size and, in particular, have a mass-average diameter Dm equal to 21 microns and a particle size distribution such that Dm/Dn=1.4.

EXAMPLE 3

Preparation of a Catalyst

The operation is carried out exactly as in Example 2, except for the fact that 150 ml, instead of 100 ml of a solution containing 0.2 mole/l of a diethylaluminium chloride in n-hexane are employed, and 100 ml of a solution containing 0.24 mole/l, instead of 0.16 mole/l, of vanadyl trichloride, and 0.06 mole/l, instead of 0.04 mole/l, of vanadyl tri-n-propoxide in n-hexane. A catalyst (C) is obtained, whose characteristics are collated in Table 1.

EXAMPLE 4

Preparation of a Catalyst

The operation is carried out exactly as in Example 2, except for the fact that at solution containing 0.12 mol/l, instead of 0.16 mole/l, of vanadyl trichloride and 0.08 mole/l, instead of 0.04 mole/l, of vanadyl tri-n-propoxide in n-hexane is employed. A catalyst (D) is obtained, whose characteristics are collated in Table 1.

EXAMPLE 5

Preparation of a Catalyst

The operation is carried out exactly as in Example 2, except for the fact that after having added the solution of diethylaluminium chloride in n-hexane to the suspension of magnesium chloride, the mixture is stirred for 2 hours at 45° C. instead of one hour at 35° C., and that a solution containing 0.18 mole/l, instead of 0.16 mole/l, of vanadyl trichloride and 0.02 mole/l, instead of 0.04 mole/l, of vanadyl tri-n-propoxide in n-hexane is then employed. A catalyst (E) is obtained, whose characteristics are collated in Table 1.

EXAMPLE 6

Preparation of a Catalyst

The operation is carried out exactly as in Example 2, except for the fact that 100 ml of a solution containing 0.16 mole/l of vanadium tetrochloride, instead of 0.16 mol/l of vanadyl trichloride, and 0.04 mole/l of vanadium tetra-n-propoxide, instead of 0.04 0.04 mole/l of vanadyl tri-n-propoxide are employed. A catalyst (F) is obtained, whose characteristics are collated in Table 1.

EXAMPLE 7

Comparative

Preparation of a Catalyst

The operation is carried out as in Example 2, except for the fact that a solution containing 0.03 mole/l, instad of 0.016 mole/l, of vanadyl trichloride in n-hexane is employed, this solution being completely free from vanadyl tri-n-propoxide. A catalyst (G) is obtained, whose characteristics are collated in Table 1.

EXAMPLE 8

Comparative

Preparation of a Catalyst

The operation is carried out exactly as in Example 2, except for the fact that no diethylaluminium chloride solution is employed. A catalyst (H) is obtained, whose characteristics are brought together in Table 1.

EXAMPLE 9

Preparation of an Ethylene Prepolymer 2 liters of n-hexane which is heated to 60° C., 8 millimoles of triethylaluminium, 4 millimoles of diethylaluminium chloride and the catalyst (B) prepared in Example 2 in a quantity corresponding to 4 millimoles of vanadium are introduced in succession under a nitrogen atomsphere into a 5-liter stainless steel reactor equiped with a stirring system rotating at 750 revolutions per minute. 1 liter of hydrogen, measured under normal conditions, is then introduced into the reactor, followed by ethylene at a uniform rate of 80 g/h for 4 hours. At the end of this time and after cooling the prepolymer suspension to ambient temperature and evaporating off n-hexane, approximately 320 g are collected of a prepolymer powder which is stored under a nitrogen atmosphere and which has the following characteristics:

spherical particles which have a mass-average diameter Dm: 95 microns bulk density: 0.43 g/cm$^3$ quantity of prepolymer per millimole of vanadium: 80 g.

Polymerization of ethylene in the gaseous phase 200 g of a polyethylene powder originating from a previous reaction, perfectly inert and anhydrous, a quantity of prepolymer prepared previously corresponding to 0.1 millimole of vanadium, 1 millimole of triisobutylaluminium and a volume of hydrogen corresponding to a partial pressure of 0.05 MPa are introduced under a nitrogen atmosphere into a 2.6-liter stainless steel reactor equipped with a stirring device for dry powder, rotating at a speed of 250 revolutions per minute. The reactor is heated to 80° C. and ethylene is introduced into it until a total pressure of 0.6 MPa is obtained, which is kept constant throughout the polymerization period by adding ethylene. After 3 hours' reaction, 600 g of a polyethylene are recovered in the form of a powder which has the following characteristics:

vanadium content: 12 ppm melt index (MI$_{5/190}$) measured at 190° C. under a 5-kg load: 2.5 g/10 minutes bulk density: 0.42 g/cm$^3$ spherical particles with Dm: 290 microns molecular weight distribution: Mw/Mn: 8.

EXAMPLE 10

Polymerization of Ethylene in Suspension in N-Hexane 2 liters of n-hexane which is heated to 70° C. and 5 millimoles of tri-n-octylaluminium are introduced in succession under a nitrogen atmosphere into a 5-liter stainless steel reactor equipped with a stirring system rotating at 750 revolutions per minute, followed by the catalyst (C) prepared in Example 3 in a quantity corresponding to 0.5 millimoles of vanadium, a volume of hydrogen corresponding to a partial pressure of 0.15 MPa, and ethylene at a uniform rate of 160 g/h for 3 hours. At the end of this time, after cooling the polymer suspension to ambient temperature and evaporating off n-hexane, approximately 480 g are collected of a polyethylene powder which has the following characteristics:

spherical particles with DM: 280 microns bulk density; 0.410 g/m$^3$ weight content of fine particles which have a diameter of less than 80 microns: 0.5%
melt index (MI$_5$/$_{190}$) measured at 190° C. under a 5-kg load; 0.94 g/10 minutes
moleculare mass distribution: Mw/Mn: 9

EXAMPLE 11

Preparation of a Prepolymer of Ethylene and of Propylene 2 liters of n-hexane, 12 millimoles of triisobutylaluminium, 40 millimoles of chloroform and the catalyst (D) prepared in Example 4 in a quantity corresponding to 4 millimoles of vanadium are introduced in succession under a nitrogen atmosphere and at ambient temperature (20° C.) into a 5-liter stainless steel reactor equipped with a stirring system rotating at 750 revolutions per minute. The reactor is heated to 35° C. and a mixture containing 95 mol % of ethylene and 5 mol % of propylene is then introduced into it at a uniform rate of 80 g/h, for 4 hours. At the end of this time and after cooling the prepolymer suspension to ambient temperature and evaporating off n-hexane, 320 g are collected of a prepolymer powder which is stored under a nitrogen atmosphere and which has the following characteristics:
   spherical particles which have Dm: 100 microns
   weight content of ethylene-derived units: 90%
   degree of crystallinity of polyethylene type: 22%
   quantity of prepolymer per millimole of vanadium: 80 g.

Gas Phase Copolymerization of Propylene and 1-Butene 150 g of a propylene and 1-butene copolymer powder originiating from a previous reaction, perfectly inert and anhydrous, a quantity of the prepolymer prepared previously corresponding to 0.1 millimole of vanadium, 1.5 millimoles of triisobutylaluminium, 3 millimoles of chloroform and a volume of hydrogen corresponding to a partial pressure of 0.03 MPa are introduced under a nitrogen atmosphere into a 2.6-liter stainless steel reactor equipped with a stirring system for dry powder, rotating at a speed of 250 revolutions per minute. The reactor is heated to 50° C. and a gas mixture containing 70 mol % of propylene and 30 mol % of 1-butene is introduced into it until a total pressure of 0.25 MPa is obtained, and this is kept constant throughout the copolymerization period by adding the gas mixture. At the end of 5 hours' reaction, 490 g are recovered of copolymer in the form of a nonadhesive powder which has the following characteristics:
   vanadium content: 14 ppm
   melt index: MI$_5$/$_{190}$: 1.1 g/10 minutes
   weight content of units derived from 1-butene: 28%
   spherical particles with Dm: 250 microns
   molecular weight distribution Mw/Mn: 7.

EXAMPLE 12

Preparation of a Prepolymer of Ethylene and of Propylene

The operation is carried out exactly in Example 11, except that the catalyst (E) prepared in Example 5 is employed instead of the cartalyst (D) prepared in Example 4.

Copolymerization of Ethylene and of Propylene in the Gaseous Phase 150 g of an ethylene and propylene copolymer powder originating from a previous reaction, perfectly inert and anhydrous, 4 millimoles of triisobutylaluminium and 12.5 millimoles of chloroform are introduced under a nitrogen atmosphere into a 2.6-liter stainless steel reactor equipped with a stirring device for dry powder, rotating at a speed of 250 revolutions per minute, followed by a quantity of prepolymer prepared previously corresponding to 0.1 millimole of vanadium, and a volume of hydrogen corresponding to a partial pressure of 0.012 MPa. The reactor is heated to 40° C. and a gas mixture containing 70 mol % of ethylene and 30 mol % of propylene is introduced into its until a total pressure of 0.4 MPa is obtained, which is kept constant throughout the copolymerization period by adding this gas mixture. At the end of the 5 hours' reaction, 600 g of copolymer are recovered in the form of a powder which has the following characteristics:
   vanadium content: 11 ppm
   melt index MI$_5$/$_{190}$: 0.8 g/10 minutes
   weight content of ehtylene-derived units: 63%
   spherical particles with Dm: 250 microns
   molecular weight distribution Mw/Mn: 8.1
   degree of crystallinity of polyethylene type: below 1%
   viscosimetry molecular mass as polyethylene equivalent: 470,000.

EXAMPLE 13

Preparation of a Prepolymer of Ethylene and of Propylene

The operation is carried out exactly as in Example 11, except for the fact that the catalyst (F) prepared in Example 6 is employed instead of the catalyst (D) prepared in Example 4.

Gas Phase Copolymerization of Ethylene, Propylene and Ethylidenenorbornene 150 g of an ethylene, propylene and ethylideneorbornene copolymer powder originating from a previous reaction, perfectly inert and anhydrous, 4 millimoles of triisobutylaluminium, 12.5 millimoles of chloroform and a volume of hydrogen corresponding to a partial pressure of 0.009 MPa are introduced under a nitrogen atmosphere into a 2.5 liter stainless steel reactor equipped with a stirring system for dry powder, rotating at 250 revolutions per minute, followed by a quantity of prepolymer prepared previously corresponding to 0.1 millimole of vanadium. The reactor is heated to 45° C. A gas mixture containing 75% of ethylene and 25% of proplylene by volume is introduced into it until a pressure of 0.5 MPa is obtained, which is kept constant throughout the copolymerization period by adding this gas mixture, together with a quantity of ethylidenenorbornene every 75 minutes. At the end of 5 hours' reaction, 600 go of copolymer are recovered in the form of a powder which has the following characterisitics:
   vanadium content: 12 ppm
   melt index (MI$_5$/$_{190}$): 0.3 g/10 minutes
   bulk density: 0.37 g/cm$^3$
   degree of crystallinity of polyethylene type: <1%
   weight content of units derived from ethylene: 65%
   weight content of units derived from ethylidenenorbornene: 3.3% spherical particles with Dm: 220 microns
molecular weight distribution MW/Mn: 8.

EXAMPLE 14

Preparation of a Prepolymer of ethylene and of Propylene

The operation is carried out exactly as in Example 11, except for the fact that the catalyst (G) prepared in Comparative Example 7 is employed instead of the catalyst (D) prepared in Example 4.

Copolymerizaton of Ethylene and of Propylene in the Gaseous Phase

The operation is carried out exactly as in Example 12, except for the fact that the prepolymer prepared previously is employed instead of the prepolymer prepared in Example 12. Under these conditions, the copolymer obtained has the following characteristics:

vanadium content: 16 ppm
melt index $MI_5/_{190}$: 0.4 g/10 minutes
Dm: 240 microns
molecular weight distribution Mw/Mn: 14.5.

EXAMPLE 15

Preparation of a Prepolymer of Ethylene and of Propylene

The operation is carried out as in Example 11, except for the fact that the catalyst (H) prepared in Comparative Example 8 is employed instead of the catalyst (D) prepared in Example 4.

Copolymerization of Ethylene and of Propylene in the Gaseous Phase

The operation is carried out exactly as in Example 12, except for the fact that the prepolymer prepared previously is employed instead of the prepolymer prepared in Example 12. Under these conditions, the copolymer obtained has the following characteristics:
vanadium content: 30 ppm
melt index $MI_5/_{190}$: 0.45 g/10 minutes
weight content of ethylene-derived units: 72%
Dm: 180 microns
molecular weight distribution Mw/Mn: 9

EXAMPLE 16

Preparation of a Prepolymer of Ethylene and of Propylene

The operation is carried out exactly as in Example 11, except for the fact that the catalyst (C) prepared in Example 3 is employed instead of the catalyst of (D) prepared in Example 4 and 8 millimoles instead of 40 millimoles of chloroform.

Gas Phase Copolymerization of Ethylene and of Propylene

The operation is carried out exactly as in Example 12, except for the fact that the prepolymer prepared previously is employed instead of the prepolymer prepared in Example 12, and a gas mixture containing 60 mol %, instead of 70%, o ethylene and 40 mol %, instead of 30%, of propylene. Under these conditions, 600 go of a copolymer which has the following characteristics are recovered:
vanadium content: 11 ppm
melt index $MI_5/_{190}$: 0.95 g/10 minutes
weight content of ethylene-derived units: 52%
spherical particles which has a mass-average diameter Dm of 260 microns
degree of crystallinity of polyethylene type: <1
weight-average moleculare weight: 244,000.

TABLE 1

| | Characteristics of the catalysts | | | | | | |
|---|---|---|---|---|---|---|---|
| Example | $V^3 \pm /Vt$ | Vt/Mg | Cl/Mg | Al/Mg | DIAE/Mg | OR/Mg | % by weight of V |
| 2 | 0.5 | 0.18 | 2.56 | 0.1 | 0.04 | 0.1 | 6.6 |
| 3 | 0.65 | 0.23 | 2.6 | 0.19 | 0.02 | 0.33 | 8.56 |
| 4 | 0.56 | 0.16 | 2.58 | 0.12 | 0.03 | 0.09 | 5.93 |
| 5 | 0.35 | 0.18 | 2.56 | 0.10 | 0.04 | 0.09 | 6.61 |
| 6 | 0.55 | 0.174 | 2.46 | 0.114 | 0.03 | 0.11 | 6.58 |
| 7 (comp.) | 0.98 | 0.227 | 2.83 | 0.18 | 0.03 | 0 | 8.2 |
| 8 (comp.) | 0 | 0.1 | 2.2 | 0 | 0.06 | 0.14 | 4.36 |

We claim:

1. A process for preparing an elastomeric copolymer of propylene with ethylene and/or 1-butene having a propylene content by weight of 30 to 72% and obtaining said elastomeric copolymer directly in the form of a non-adhesive powder with a high yield, which process comprises copolymerising in a gas phase reactor propylene with ethylene and/or 1-butene at a temperature from 0° to 60° C. under a total pressure from 0.1 to 5 MPa in the presence of (i) a catalyst based on a vanadium compound precipitated within a liquid hydrocarbon by reduction reaction of vanadium on a spherical support of magnesium dichloride and (ii) an organoaluminum compound cocatalyst, said catalyst being prepared by contacting with said liquid hydrocarbon:
   (a) a vanadium-reducing agent selected from the group consisting of organoaluminum, organomagnesium or organozinc compounds with,
   (b) a vanadium compound soluble in said liquid hydrocarbon and containing halogen atom, X, and alkoxy group, OR, in a molar ratio X:OR, from 0.051 to 20:1, and
   (c) a solid support consisting of spherical particles and containing (i) from 80 to 99.5 mol % of magnesium dichloride substantially free from any product containing a Mg—C bond, and (ii) from 0.5 to 20 mol % of at least one organic electron-donor compound, D, free from labile hydrogen.

2. A process according to claim 1, wherein an elastomeric copolymer of propylene with ethylene and/or 1-butene and an unconjugated diene is prepared by copolymerising in the gas phase propylene with ethylene and/or 1-butene and the unconjugated diene.

3. A process according to claim 2, wherein the unconjugated diene is selected from the group consisting of ethylidenenorbornene, 4-methyl-1,4-hexadiene, 2-methyl-1,5-hexadiene or 1,4-hexadiene.

4. A process according to claim 1, wherein the copolymerization is carried out in a fluidized bed reactor.

5. A process according to claim 1, wherein the copolymerization is carried out in the presence of a halogenated hydrocarbon.

6. A process according to claim 5, wherein the halogenated hydrocarbon is the chloroform.

7. A process according to claim 1, wherein the catalyst and the cocatalyst are employed in a proportion such that the molar ratio of the cocatalyst to the quantity of vanadium of the catalyst is from 0.5 to 50.

8. A process according to claim 1, wherein the particles of the support used for preparing the catalyst have a mass-average diameter Dm of 10 to 100 microns.

9. A process according to claim 1, wherein the particles of the support used for preparing the catalyst have a narrow particle size distribution such that the ratio of the mass-average diameter Dm to the number-average diameter Dn of the particles is less than 2.

10. A process according to claim 1, wherein the catalyst is used in the form of a prepolymer obtained by submitting the catalyst to an olefin prepolymerisation step in the presence of a cocatalyst.

11. A process according to claim 10, wherein the prepolymer contains 10 to 500 g of polyolefin per millimole of vanadium.

12. A process according to claim 1, wherein the molar amounts of the vanadium-reducing agent and the vanadium compound employed during the catalyst preparation respectively are from 0.05 to 1.5 and from 0.05 to 2 per mole of magnesium dichloride of the support.

13. A process according to claim 1, wherein the vanadium-reducing agent is an alkylaluminum.

14. A process according to claim 13, wherein the alkalaluminum is an alkylaluminum halide.

15. A process according to claim 1, wherein the vanadium compound had a molar ratio X:OR from 1 to 10.

16. A process according to claim 1, wherein the vanadium compound has either of the two general formulae:

$$V(OR)_{4-m}X_m$$
II or
$$VO(OR)_{3-n}X_n$$

in which formulae R denotes an alkyl radical containing from 1 to 12 carbon atoms, X a halogen atom, m an integral or fractional number from 0.2 to 3.8, and n an integral or fractional number from 0.14 to 2.85.

17. A process according to claim 16, wherein m is an integral or fractional number from 2 to 3.6 and n an integral or fractional number from 1.5 to 2.7.

18. A process according to claim 1, wherein the solid support contains (i) from 80 to 95 mol % of magnesium dichloride and (ii) from 5 to 20 mol % of the organic electron-donor compound, D.

19. A process according to claim 1, wherein the solid support contains (i) from 80 to 90 mol % of magnesium dichloride and (ii) from 10 to 20 mol % of the organic electron-donor compound, D.

20. A process according to claim 1, wherein the organic electron-donor compound D, is selected from the group consisting of ethers, thioethers, sulphones, sulphoxides, phosphines, amines and amides.

21. A process according to claim 1, wherein the organic electron-donor compound, D, is an ether having the formula $$R_4OR_5$$

in which R4 and R5 are identical or different alkyl radicals from 1 to 12 carbon atoms.

* * * * *

UNITED STATES PATENT AND TRADEMARK OFFICE
CERTIFICATE OF CORRECTION

PATENT NO. : 5,208,303  
DATED : May 4, 1993  
INVENTOR(S) : JEAN-CLAUDE A. BAILLY

Page 1 of 2

It is certified that error appears in the above-indentified patent and that said Letters Patent is hereby corrected as shown below:

Col. 1, l. 28, should read "compound on the said support,"

Col. 1, l. 38, correct the spelling of the word "and"

Col. 4, l. 1, should read "different alkyl radicals"

Col. 4, l. 19, should read "an excellent support character-"

Col. 4, lines 35 and 36, should read "such as n-hexane or n-heptane"

Col. 6, l. 48, the first compound should read "4-methyl-1,4-hexadiene"

Col. 9, l. 55, should read "containing 0.3 mole/l, and correct the spelling of the word "instead"

Col. 11, l. 5, correct the spelling of the word "molecular"

Col. 12, l. 43, should read "ethylidenenorbornene"

Col. 12, l. 60, should read "600 g of"

Col. 14, l. 9, should read "600 g of a"

Col. 14, l. 18, correct the spelling of the word "molecular"

Claim 1, col. 14, line 53, the first amount should read "0.05:1"

Claim 14, col. 15, line 39, correct the spelling of the word "alkylaluminum"

UNITED STATES PATENT AND TRADEMARK OFFICE
CERTIFICATE OF CORRECTION

PATENT NO. : 5,208,303
DATED : May 4, 1993
INVENTOR(S) : Jean-Claude A. Bailly

It is certified that error appears in the above-indentified patent and that said Letters Patent is hereby corrected as shown below:

Claim 16, 1. 8, after the first formula delete the number "II"

Signed and Sealed this

Eleventh Day of October, 1994

BRUCE LEHMAN

Attest:

Attesting Officer

Commissioner of Patents and Trademarks